(12) United States Patent
Yoshida et al.

(10) Patent No.: US 7,757,041 B2
(45) Date of Patent: Jul. 13, 2010

(54) STORAGE DEVICE USING NONVOLATILE CACHE MEMORY AND CONTROL METHOD THEREOF

(75) Inventors: Kenji Yoshida, Akishima (JP); Koichi Nishide, Tachikawa (JP); Yoriharu Takai, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 11/785,369

(22) Filed: Apr. 17, 2007

(65) Prior Publication Data

US 2007/0250662 A1    Oct. 25, 2007

(30) Foreign Application Priority Data

Apr. 21, 2006    (JP) .............................. 2006-118226

(51) Int. Cl.
   *G06F 13/00*    (2006.01)
(52) U.S. Cl. ....................................... 711/113; 711/154
(58) Field of Classification Search .................. 711/113
   See application file for complete search history.

(56) References Cited

U.S. PATENT DOCUMENTS

| 6,304,405 B1 * | 10/2001 | Asano et al. | ............... | 360/73.03 |
| 2004/0202073 A1 * | 10/2004 | Lai et al. | .................. | 369/47.33 |

FOREIGN PATENT DOCUMENTS

| CN | 1606082 | 4/2005 |
| JP | 64-036351 | 2/1989 |
| JP | 05-189316 | 7/1993 |
| JP | 05-257810 | 10/1993 |
| JP | 06-124596 | 5/1994 |
| JP | 2004-055102 | 2/2004 |

OTHER PUBLICATIONS

Chinese Office Action dated Aug. 8, 2008 for Appln. No. 2007101044350.

* cited by examiner

*Primary Examiner*—Mardochee Chery
(74) *Attorney, Agent, or Firm*—Pillsbury Winthrop Shaw Pittman, LLP

(57) ABSTRACT

Commands are provided for storing data in a plurality of different types of storage media, thereby eliminating the storage errors of important data and improving usability. A storage device comprises a host interface, a hard disk interface acting as an interface to a hard disk, a flash memory interface acting as an interface to a flash memory, a command analyzing section which analyzes the contents of a command inputted from the host interface, and a data write operation processing section which performs a data write operation on both of the hard disk and the flash memory when the command analyzed in the command analyzing section is a predetermined command for write-through acting as a command for writing data into a plurality of media.

3 Claims, 7 Drawing Sheets

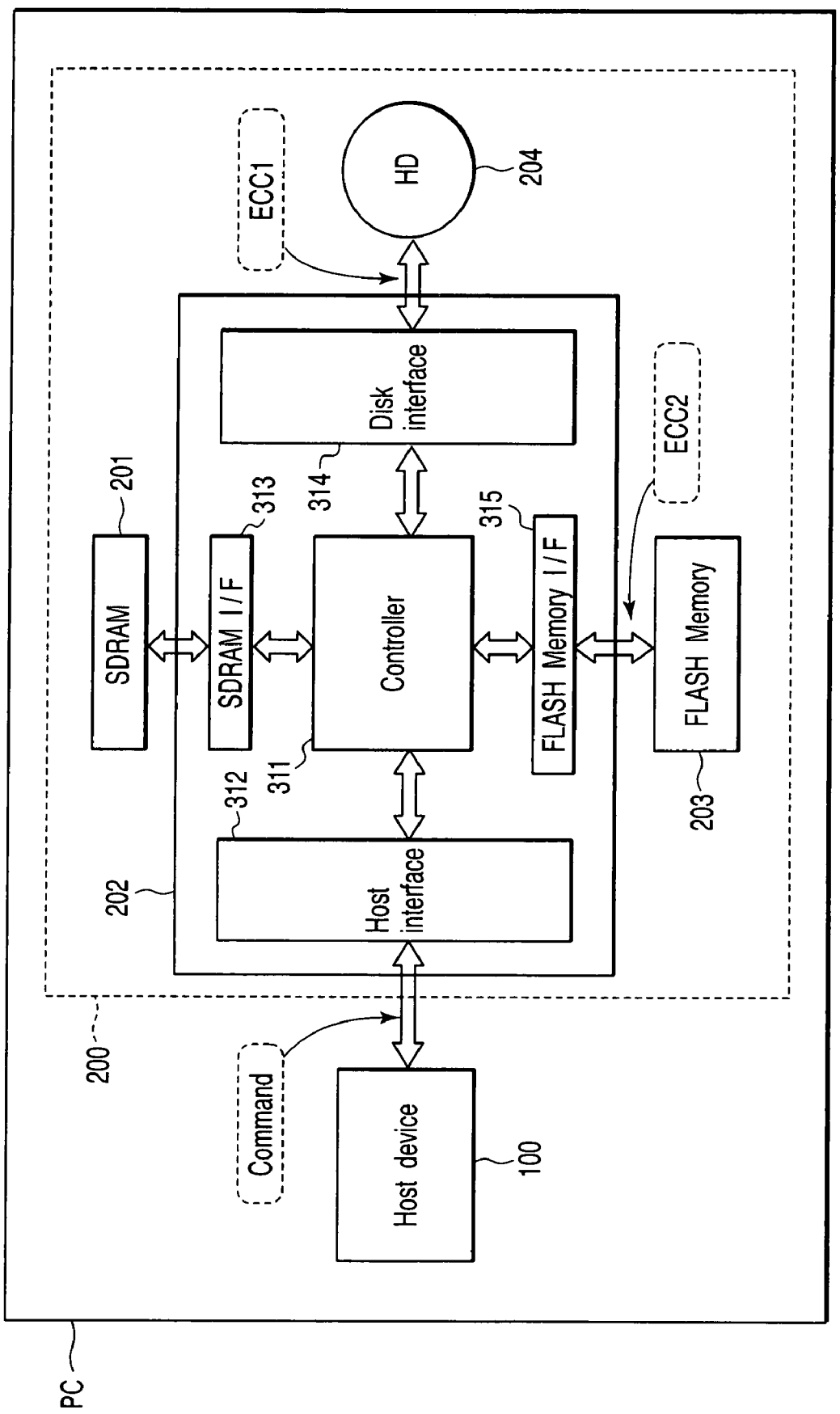
F I G. 1

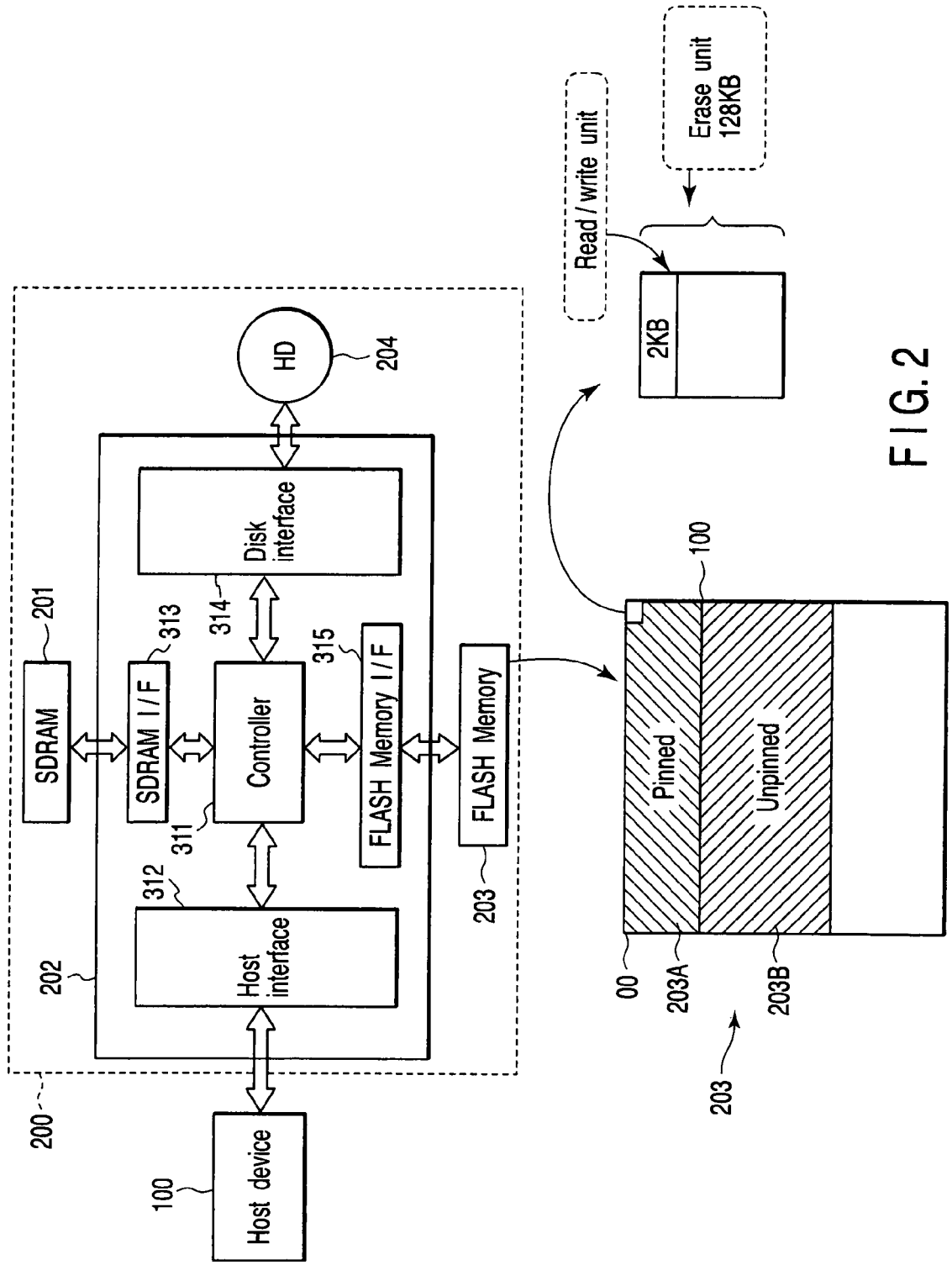
F I G. 2

STORAGE DEVICE USING NONVOLATILE CACHE MEMORY AND CONTROL METHOD THEREOF

CROSS-REFERENCE TO RELATED APPLICATIONS

This application is based upon and claims the benefit of priority from the Japanese Patent Application No. 2006-118226, filed Apr. 21, 2006, the entire contents of which are incorporated herein by reference.

BACKGROUND

1. Field

One embodiment of the invention relates to a storage device using a nonvolatile cache memory and a control method thereof, and the storage device capable of realizing low power consumption and high-speed read/write operation is configured to eliminate in particular storage errors of important data.

2. Description of the Related Art

In recent years, a storage device on which both of a memory card which is a semiconductor storage medium and a hard disk (HD) drive using a hard disk which is a magnetic storage medium can be mounted is developed (refer to Jpn. Pat. Appln. KOKAI Publication No. 2004-055102). For example, data of the memory card fetched from the exterior can be backed up into the hard disk (HD) which is a magnetic storage medium. Further, data of a hard disk (HD) can be transferred to the memory card and can be thus taken out.

As a mobile storage device, a storage device using a flash memory is developed (refer to Japanese Patent Publication No. 3407317). A large number of errors occur in the flash memory when the number of erase operations of the flash memory becomes large (for example, 100,000 times), and therefore, an attempt is made to solve the above problem. For example, a data management method for suppressing the number of erase operations for a specified area from becoming larger is provided.

As described above, there are devices using a plurality of various types of recording media, however, each of them has drawback and advantage. Although semiconductor devices such as memory card and flash memory have low power consumption and high write speed, they are unsuitable for storing large volumes of data. On the other hand, the hard disk is suitable for storing large volumes of data for a long time, but is inferior to semiconductor devices in low power consumption and high-speed data writing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary block diagram showing the whole configuration of one embodiment according to this invention.

FIG. 2 is a diagram for illustrating the feature of a flash memory shown in FIG. 1.

DETAILED DESCRIPTION

Figure 3:
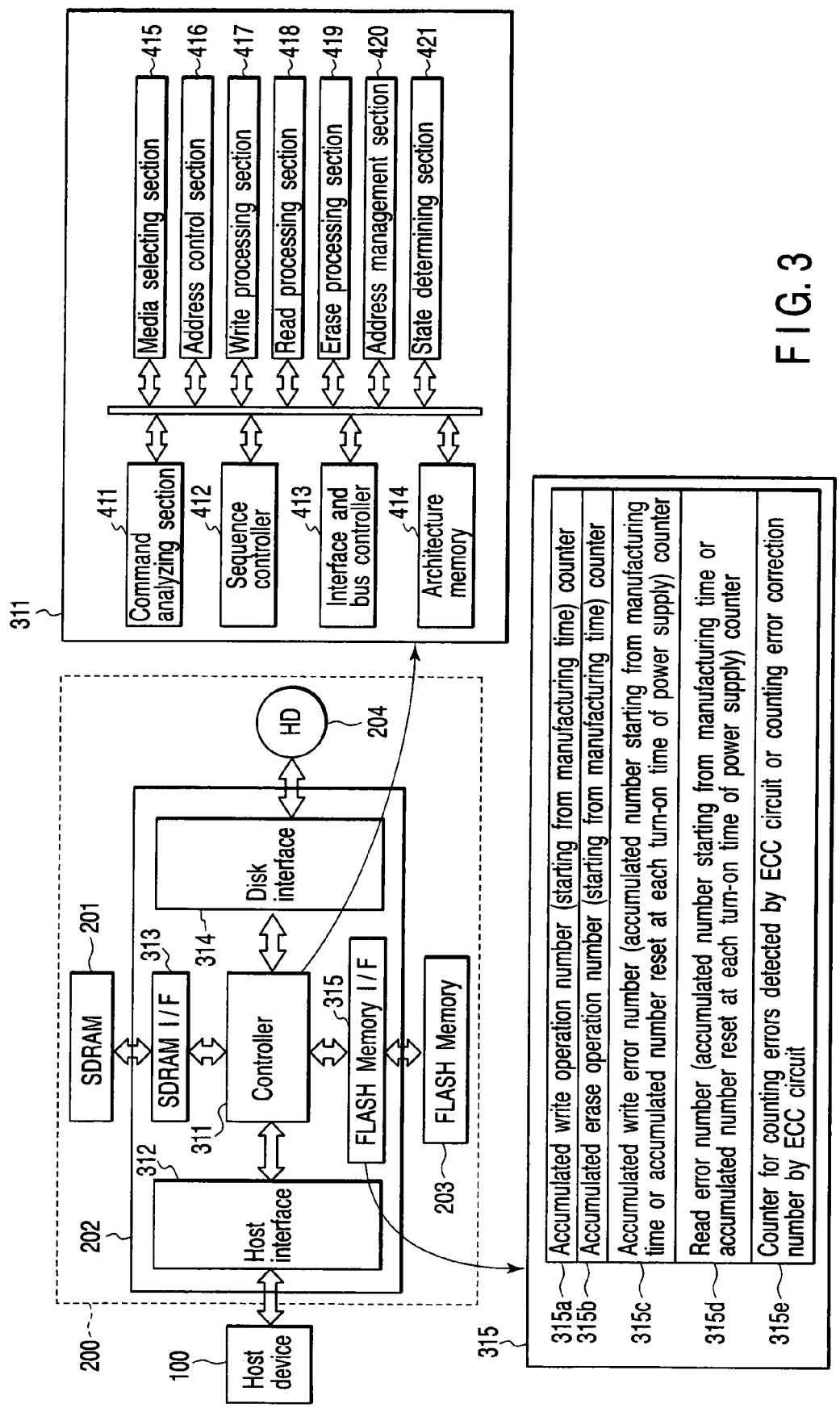
FIG. 3 is a diagram for illustrating the functions of a flash memory interface and controller 311 shown in FIG. 1.

Various embodiments according to the invention will be described hereinafter with reference to the accompanying drawings.

According to one embodiment, there is provided a storage device providing a command for storing data in a plurality of different types of storage media and using a nonvolatile cache memory capable of eliminating storage errors of important data and a control method thereof.

The present embodiment includes a host interface, a hard disk interface acting as an interface to a hard disk, a flash memory interface acting as an interface to a flash memory, a command analyzing section which analyzes a command inputted from the host interface, and a data write operation processing section performing a data write operation on both of the hard disk and flash memory when the command analyzed in the command analyzing section is a predetermined command for a write-through acting as a command for writing data into a plurality of media.

With use of the above procedures, and by taking advantage of the predetermined command, the reliability of data write operation and data processing can be improved.

Now, the embodiment will be described more specifically.

<Whole Configuration and Function>

First, an example of a whole block of the embodiment is explained with reference to FIG. 1. A reference symbol 100 denotes a host device which is a control section in a personal computer, for example. A reference symbol 200 denotes a storage device using a nonvolatile cache memory. The storage device 200 includes an SDRAM 201 functioning as a buffer, for example, one-chip large-scale integrated circuit (LSI) 202 on which a controller and the like which will be described later are mounted, flash memory 203 as a nonvolatile memory, and a hard disk (HD) 204 being drove by a hard disk driver (not shown).

The LSI 202 includes a controller 311, host interface 312, SDRAM interface 313, disk interface 314 and flash memory interface 315. The SDRAM 201 may be contained in the LSI 202. Further, not only the SDRAM, but also both of the flash memory and SDRAM or only the flash memory may be contained in the LSI.

The host device 100 can supply a command to the controller 311 via the host interface 312. Further, the host device 100 can receive data from the controller 311 via the host interface 312 and transfer data to the controller 311 side.

Commands from the controller 311 includes a data write command, data read command, data size specifying command, data transferring command, memory command and a command for read information. The controller 311 interprets the command from the host device 100 and performs the data write process, read process and transfer process.

The controller 311 can transfer data with respect to the SDRAM 201 via the SDRAM interface 313. Further, the controller 311 can transfer data with respect to the HD 204 via the disk interface 314. In addition, the controller 311 can transfer data with respect to the flash memory 203 via the flash memory interface 315. Data to be stored in the flash memory 203 is stored after an error correction code is added thereto. In addition, for a flash memory having an incorporated ECC processing function, no ECC circuit is required on the LSI side.

Also data to be stored in the hard disk is stored after an error correction code is added thereto. An ECC process is performed with respect to recording data into the flash memory and recording data into the hard disk so that an error correcting process can be performed at the reproduction time.

The above apparatus uses portions of the flash memory interface 315 and flash memory 203 as a cache.

The data writing sequence and data reading sequence are determined according to software stored in the controller 311. For example, when write data is transferred from the host device 100 to the hard disk 204, the data may be transferred via a path of host interface 312→controller 311→SDRAM interface 313→SDRAM 201→SDRAM interface 313→controller 311 disk interface 314→hard disk 204 or via a path of host interface 312→controller 311→flash memory interface 315→flash memory 203→flash memory interface 315→controller 311→disk interface 314→hard disk 204. Further, the data can be transferred via a path of host interface 312→controller 311→flash memory interface 315→flash memory 203→flash memory interface 315→controller 311→SDRAM interface 313→SDRAM 201→SDRAM interface 313→controller 311→disk interface 314→hard disk 204. Further, the data can be transferred via a path of host device→controller 311→SDRAM interface 313→controller 311→flash memory 203→controller 311→HD 204 through corresponding interfaces.

When data is read from the hard disk 204 to the host device 100, the data may be read via a path of disk interface 314→controller 311→SDRAM interface 313→SDRAM 201→SDRAM interface 313→controller 311→host interface 312→host device or via a path of disk interface 314→controller 311→flash memory interface 315→flash memory 203→flash memory interface 315→controller 311→host interface 312→host device. Further, the data can be read via a path of disk interface 314→controller 311→flash memory interface 315→flash memory 203→flash memory interface 315→controller 311→SDRAM interface 313→SDRAM 201→SDRAM interface 313→controller 311→host interface 312→host device.

Further, the data can be read via corresponding interfaces and a path of disk→SDRAM→flash memory→host device or a path of disk→SDRAM→flash memory→SDRAM→host device.

<Explanation for Flash Memory>

FIG. 2 is a diagram for illustrating the peculiar control operation in dealing with the flash memory 203. The flash memory 203 is a nonvolatile memory, but data can be electrically erased. Therefore, it is a data rewritable nonvolatile memory.

For example, the erase unit of the flash memory 203 is specified by 128 Kbytes. Further, the reading unit and writing unit are specified by 2 Kbytes, for example. The elements of the flash memory 203 are deteriorated and the number of errors increases with an increase in the number of erasing operations. Therefore, as information which ensures the performance of the element, the number of rewriting times is limited to approximately 100,000 times. The number of bytes of the erase unit and the number of bytes of the writing unit are not limited to the above values. The erase unit may be set to 32 Kbytes and the reading/writing unit may be set to 512 bytes.

<Basic Relation between Flash Memory, Controller and Command from Host Device>

As shown in FIG. 2, when data is written into the flash memory 203, the write area can be divided into areas which are called a pinned area 203A and unpinned area 203B. The pinned area 203A is an area which is formed when a data write destination-indicating command supplied from the host device 100 positively specifies the flash memory 203. The command contains the flash memory 203 and a logical block address (LBA) thereof. The unpinned area 203B is an area which is formed when a data write destination-indicating command from the host device 100 is not specified and in which data transferred according to independent determination by the controller 311 is stored.

As data written into the flash memory 203, data supplied from the host device 100 or data read from the hard disk 204 is provided.

Various types of determination conditions for determining a data write destination by the controller 311 are provided. The state determining section of the controller 311 synthetically judges the conditions of the surroundings and determines the write destination.

<Case of Storing Data from Host Device 100 in Flash Memory 315 and SDRAM 201>

This condition occurs immediately after the power supply of the device is turned on and when the hard disk of the HD 204 does not reach the predetermined number of rotations or when the HD 204 is set in a stopped state. In this case it is more convenient to write the data into the flash memory 315 or SDRAM 210. Further, when rapid data transfer is desired, it is convenient that the data is once written from the host device 100 into the flash memory 315 and then the data is transcribed (referred to as "write back") to the HD 204 when there is enough time.

<Case in which Host Device 100 Desires to Use Data of HD 204 Iteratively>

In this case, it is convenient to read the data of the HD 204 and store it in the flash memory 315. If the data to be used is stored in the flash memory 315, high-speed access to the data is enabled.

<Function and Configuration of Flash Memory Interface 315 and Controller 311>

FIG. 3 shows the configurations of the controller 311 and flash memory interface 315 classified according to respective functions. An accumulation counter may be provided in the flash memory interface 315, the count value thereof is written into a register provided in the interface, for example, and then written into the flash memory 203 or the flash memory 203 may be directly utilized.

As the counter, an accumulated write operation number counter 315a, accumulated erase operation number counter 315b, accumulated write error number counter 315c and read error number counter 315d are provided. Instead of the read error number counter 315d, an error number counter for counting errors detected by an ECC circuit or an error correction number counter 315e may be provided. Further, a counter which counts the reading/writing unit may be provided. The contents of the counters are used as the determination factors of the state determining section which determines whether warning is issued when the number of errors becomes larger.

The controller 311 includes a command analyzing section 411 to decode and analyze a command supplied from the host device 100. It specifies software in an architecture memory 414 based on the analysis result of the command and sets an operation sequence in a sequence controller 412. Further, the command analyzing and control operation may be performed in the interface 312.

The sequence controller 412 controls the flow of data and control data via an interface and bus controller 413. For example, when the data write or read operation is performed, a media selecting section 415 specifies a flash memory 203 or hard disk (HD) 204 and an address control section 416 specifies a write address or read address. Then, at the data write time, a write processing section 417 performs a write data transfer process or the like. Further, at the data read time, a read processing section 418 performs a read data transfer process or the like.

In addition, an erase processing section 419 is provided. The erase processing section 419 performs the erase process for data of the flash memory 203. Further, the erase processing section 419 can perform the erase process for data of the hard disk 204.

In addition, an address management section 420 is provided. The address management section 420 collectively manages addresses of the hard disk 204 and addresses of the recorded area and unrecorded area of the flash memory 203. Since the flash memory 203 is used as a cache memory, it is not necessary to pay attention to the address of the cache memory and the address of the hard disk 204 side may be set when the host device 100 side specifies the address. When a cache memory is particularly specified as a data storage destination, a pinned command may be issued. If a pinned command is not supplied, the data storage destination depends on the determination result of the firmware configured in the controller 311.

The address management and control operation for the pinned area and unpinned area of the flash memory 203 may be performed in the interface 315.

Further, a state determining section 421 is provided. The state determining section 421 monitors the state of the hard disk 204.

When the storage capacity of the flash memory 203 becomes larger than a certain threshold value, the controller 311 determines the state and performs a process of transferring and writing data into the hard disk 204. The operation performed at this time is mainly controlled by a combination of the read processing section 418, write processing section 416 and address management section 420.

<Peculiar Configuration, Function and Operation in Present Embodiment>

<Preposition> In the storage device, the data to be written from the host device 100 is written either into the HD 204 or into the flash memory 203 according to the determination of the controller 311. For example, a logical block address (LBA) to which data is to be written is not specified, it is committed to the determination (software) of the controller 311 into which medium data is to be written. Further, in the controlling operation by the controller 311 it is also committed to the determination (software) of the controller 311 whether the flash memory 203 is used as a data cache or not.

Accordingly, when the data updating date of the flash memory 203 and that of the HD 204 are compared to each other, frequently they are the same or the data updating date of the flash memory 203 is new. Further, when the flash memory 203 is used as a cache, the data once written into the flash memory 203 is written back into the HD 204.

In order to write the data positively into the flash memory 203, an LBA is specified in particular. This address specifies the pinned area described above and is referred to as a pinned LBA. Address group not specified by the host device is referred to as an unpinned LBA.

In the above description, data is written into the flash memory 203 and HD 204 sequentially. However, depending on various conditions and circumstances, data may be preferably written into both of the flash memory 203 and HD 204 concurrently in view of the reliability of data storage.

Therefore, in this device, as a new command there is defined a predetermined command for write-through which is a command for writing data into a plurality of media. If the command analyzed in the command analyzing section 411 is the predetermined command, data is written into both of the hard disk 204 and flash memory 203. Actually the write processing is performed by the write processing section 417. The above types of predetermined commands includes the following types:

(1) Write-through Set Command/Write-through Reset Command

After the write-through set command has been recognized, the write processing section 417 writes data into both of the hard disk 204 and flash memory 203 when a write command has been issued, and it moves to an operation for writing data either into the hard disk 204 or into the flash memory 203 when the write-through reset command is recognized.

(2) Command for Setting Predetermined Logical Address Area in which Write-through is Performed/ Command for Resetting Predetermined Logical Address Area in which Write-through is Performed After the command for setting a predetermined logical address area has been recognized, the write processing section 417 writes data into both of the hard disk 204 and flash memory 203 when a write command has been issued, and it moves to an operation for writing data either into the hard disk 204 or into the flash memory 203 when the command for resetting a predetermined logical address area is recognized.

(3) Combinations of Above Commands

Figure 4:
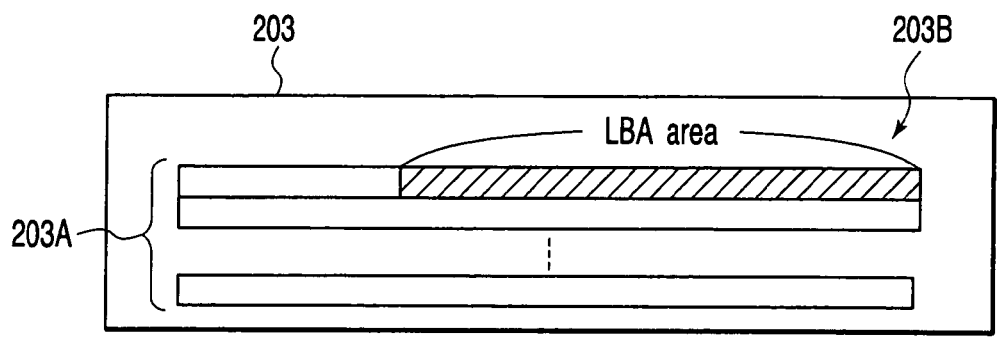
FIG. 4 is an illustrating view showing one example of a data area of the flash memory shown in FIG. 1.

FIG. 4 shows an address area 203A of the flash memory 203. In this area 203A, when the commands described in (2) above are used, that is, when a predetermined logical address area 203B is specified, data is written into both of the hard disk 204 and flash memory 203 by the operations of the command analyzing section 411 and write processing section 417.

Figure 5:
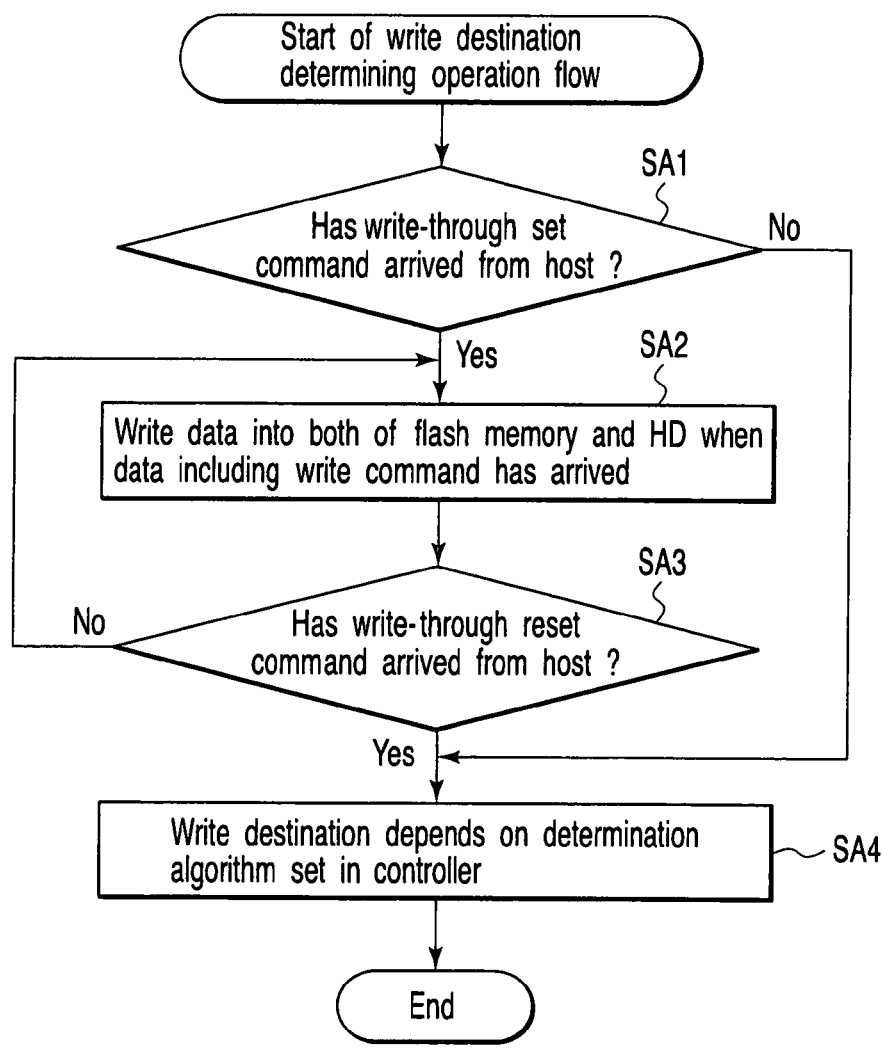
FIG. 5 is a flowchart for illustrating one example of the operation of a device shown in FIG. 1.

FIG. 5 is an example of a flowchart illustrating a logical determination operation for deciding a write destination medium. It is determined whether a write-through set command has been supplied from the host device 100 or not (Step SA1). With the write-through set command supplied, thereafter, data is written into both of the flash memory 203 and hard disk 204 when data including a write command is supplied (Step SA2). And until a write-through reset command is supplied from the host device 100, data written into both of the flash memory 203 and hard disk 204 is maintained (Step SA3). When a write-through reset command is supplied from the host device 100, the destination is determined by a determination algorithm set in the controller 311 (Step SA4). That is, the data is written into either one of the both storage media.

Figure 6:
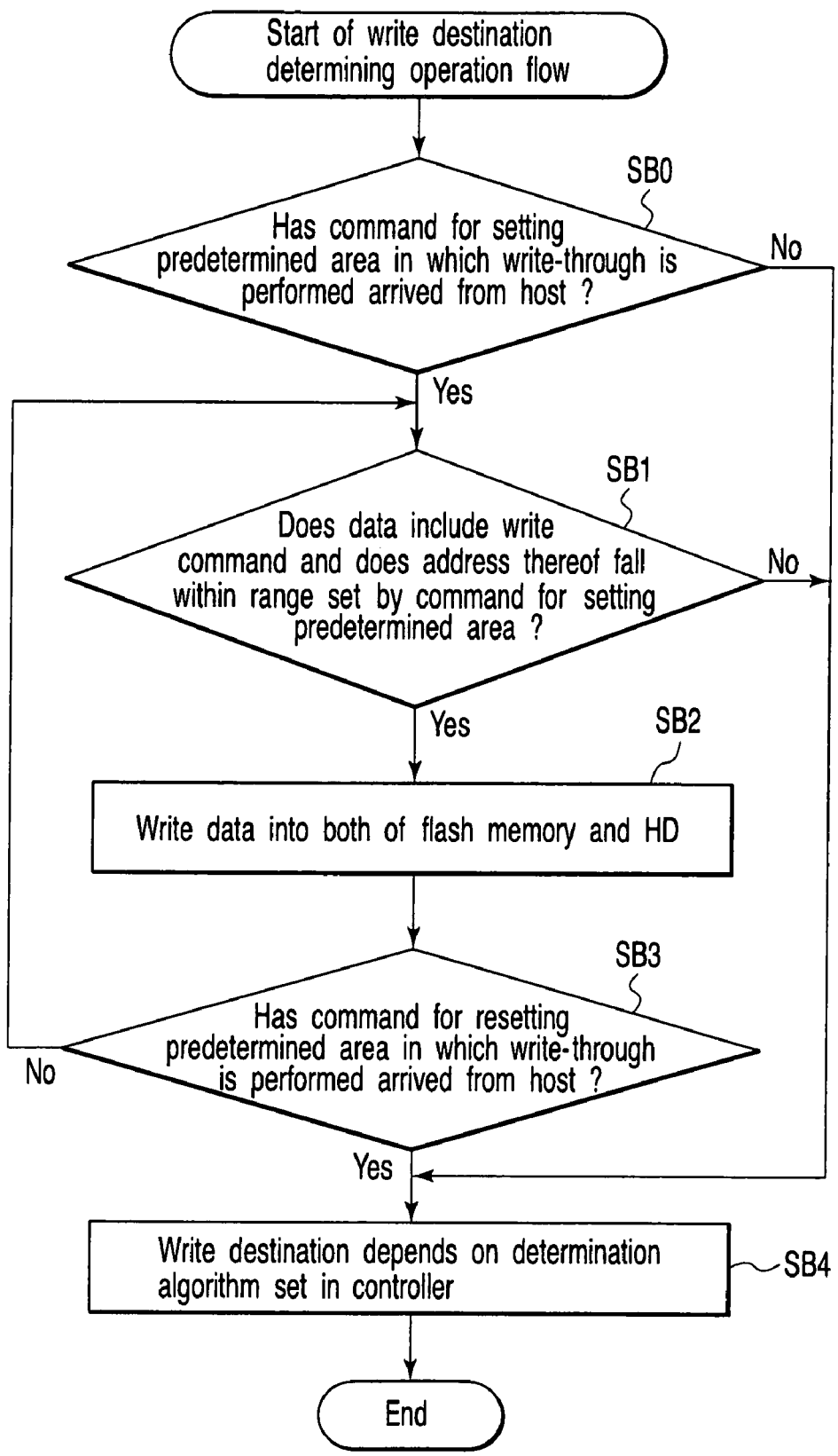
FIG. 6 is a flowchart for illustrating another example of the operation of a device shown in FIG. 1.

FIG. 6 is an example of a flowchart illustrating a logical determination operation for determining a write determination medium in another embodiment. After a predetermined area set command for performing write-through has been supplied from the host device 100 (Step SB0), it is determined whether the data is data including a write command or not and whether the address falls within a range set by the predetermined area set command (Step SB1). If the data including the write command falls within the range set by the predetermined area set command, it is written into both of the flash memory 203 and hard disk 204 (Step SB2).

Subsequently, if the predetermined area reset command is supplied from the host device 100, the data write destination thereafter is determined by the determination algorithm set in the controller 311 (Step SB4). That is, the data is written into either one of the both storage media.

In addition, if data including one write command is supplied, for example, it may sometimes happen that the first half of the write data falls within the range of the predetermined area and the second half thereof comes out of the range of the predetermined area. In such a case, data is handled for each area. That is, in this case, the write command and address are monitored, and in Step SB1, not only the data written into both of the memory and HD, but also the data written into either of them is handled. In this case, an address determination step is further provided.

Figure 7:
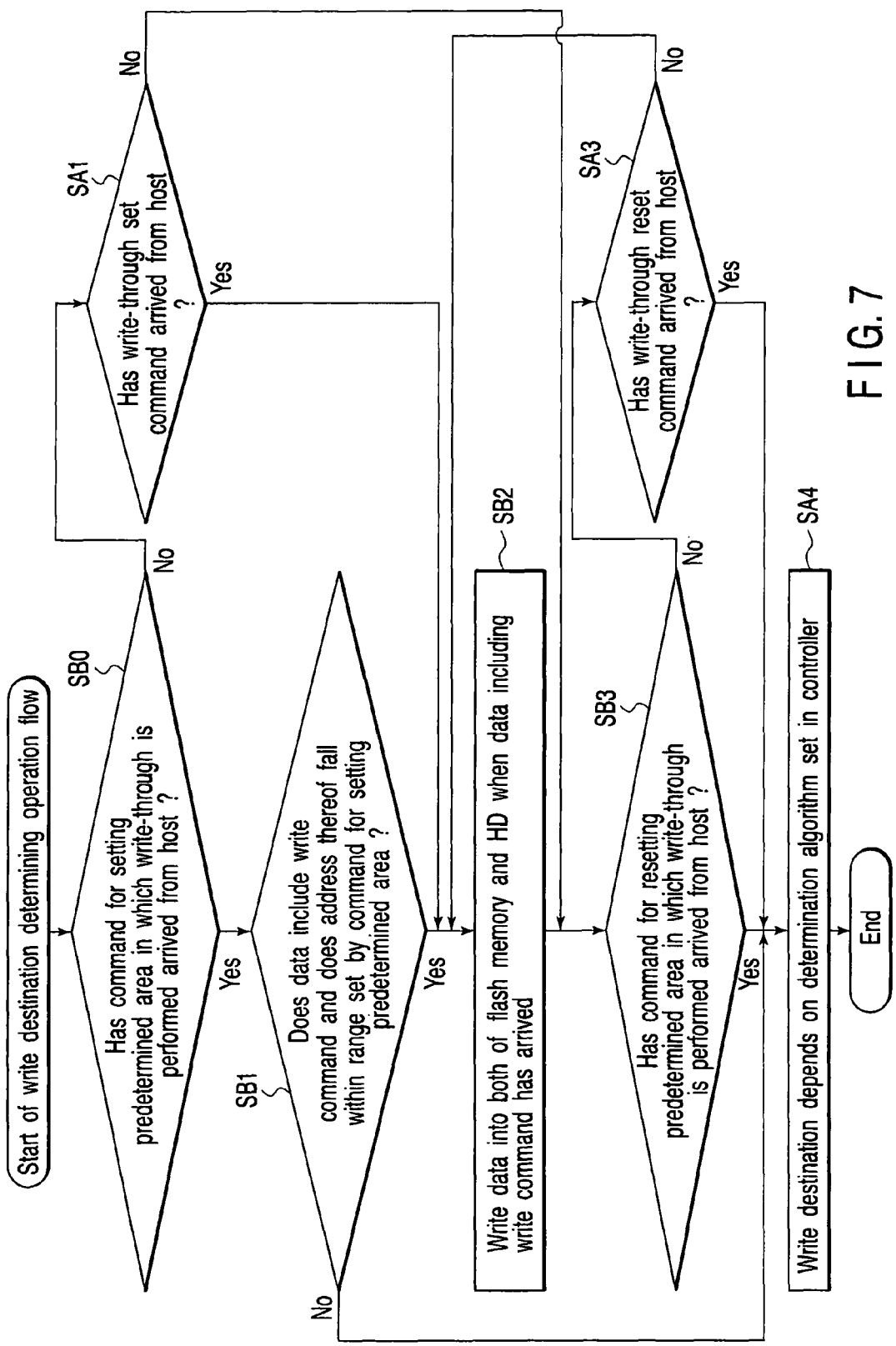
FIG. 7 is a flowchart for illustrating a further example of the operation of a device shown in FIG. 1.

FIG. 7 is an example of combinations of the flows shown in FIGS. 5 and 6. The symbols identical to those of the blocks of FIGS. 5 and 6 are assigned to the identical block portions corresponding to the blocks of FIGS. 5 and 6 respectively. The order of Steps SA1 and SB1 may be reversed. In addition, the order of Steps SA3 and SB3 may be reversed.

Figure 8:
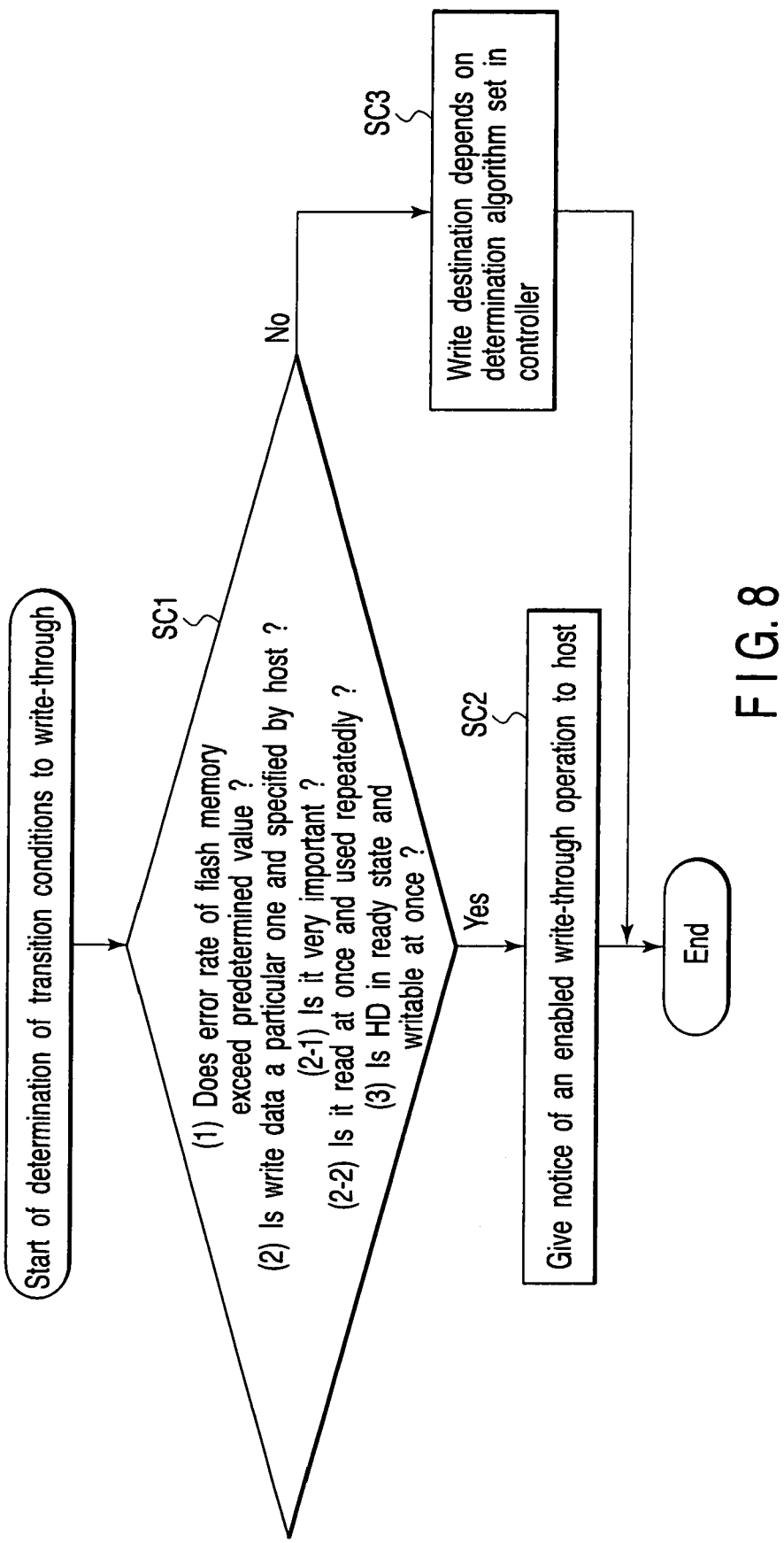
FIG. 8 is a flowchart showing one example of determination when the device shown in FIG. 1 shifts to a write-through operation mode.

FIG. 8 is a flowchart illustrating an example of an operation (for example, operation for determining the shift conditions to the write-through mode) for determining whether the predetermined write-through command, write-through set command or write-through reset command is issued or not.

This operation is performed regularly or when the device is powered on. (First Example) If the error rate of the flash memory 203 exceeds a predetermined value, the operation moves to the write-through mode. A large error rate of the flash memory 203 means a low operational reliability of the flash memory 203. (Second Example) If the write data is particular one, operation may be set to shift to the write-through mode. The particular data includes, for example, very important data (programming data, algorithm data) and data which is to be stored in the hard disk 204 and is used repeatedly by the host device 100 after having been written into the flash memory 203. In such a case it is not necessary to write back the data written into the flash memory 203 into the hard disk 204 subsequently. (Third Example) In a state in which the hard disk 204 is always writable with a sufficient number of rotations. If write-through is performed at this time, no write back processing for transferring data from the flash memory 203 into the hard disk 204 is required, thereby reducing the burden of the operation. (Fourth Example)

When the conditions of one of First to Third Examples are satisfied, the operation moves to a write-through operational mode (Steps SC1 and SC2). None of the conditions of First to Third Examples are satisfied, the write destination depends on the algorithm of the controller 311 (Step SC3).

Incidentally, in the present device, data to be stored in the flash memory 203 includes the following types of data: (1) data written into the flash memory 203 based on the determination of the controller 311 when no storage destination is specified as a storage destination for the data supplied from the host device 100; (2) data written into the flash memory 203 by adding the predetermined command of the write-through to the data supplied from the host device 100. In this case, since the same data is written into the hard disk 204 concurrently, rewrite of the data in the flash memory 203 is not required; and (3) data in the pinned area described above.

The above data are data of which handling method must be changed after they have been stored in the flash memory 203. For this purpose, these data are identified by means of flags assigned to the data in the address management section 420 of the controller 311 or in the flash memory 203.

In addition, the present invention is not limited to the embodiment as it is, and can be embodied by changing the components thereof without departing from the gist of the present invention in the implementation step. Moreover, by combining a plurality of components disclosed in the embodiment suitably, various inventions can be made. For example, several components may be deleted from all the components described in the embodiment. Further, components of different embodiments may be combined suitably.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device using a nonvolatile cache memory, comprising:
    a host interface;
    a hard disk interface acting as an interface to a hard disk;
    a flash memory interface acting as an interface to a flash memory;
    a command analyzing section analyzing a command inputted from the host interface; and
    a data write processing section configured to write data into both of the hard disk and flash memory if a write command has been issued after a command for setting a predetermined logical address area has been recognized as a predetermined command for write-through, and configured to move an operation for writing data either into the hard disk or flash memory when a command for resetting the predetermined logical address area is recognized.

2. A storage device using a nonvolatile cache memory, comprising:
    a host interface;
    a hard disk interface acting as an interface to a hard disk;
    a flash memory interface acting as an interface to a flash memory;
    a command analyzing section analyzing a command inputted from the host interface; and
    a data write processing section configured to write data into both of the hard disk and flash memory if a write command has been issued after a write-through set command has been recognized as a predetermined command for write-through or after a command for setting a predetermined logical address area has been recognized as the predetermined command for the write-through, and configured to move an operation for writing data either into the hard disk or flash memory when a write-through reset, command is recognized or a command for resetting the predetermined logical address area is recognized.

3. A storage device control method which performs a data process by using a nonvolatile cache memory including a host interface to and from which data from a host device is inputted/outputted, a command analyzing section, a memory interface for a nonvolatile cache memory, and a disk interface which inputs/outputs data to and from a hard disk, the method comprising:
    analyzing a command by the command analyzing section;
    after a command for setting a predetermined logical address area has been recognized as a predetermined command for write-through, writing data into both of the hard disk and flash memory if a write command has been issued; and
    moving an operation for writing data either into the hard disk or flash memory when a command for resetting the predetermined logical address area is recognized.

* * * * *